Oct. 25, 1955  M. SCHWARTZ ET AL  2,721,929
PHOTOFLASH EQUIPMENT
Filed May 6, 1950  5 Sheets-Sheet 1
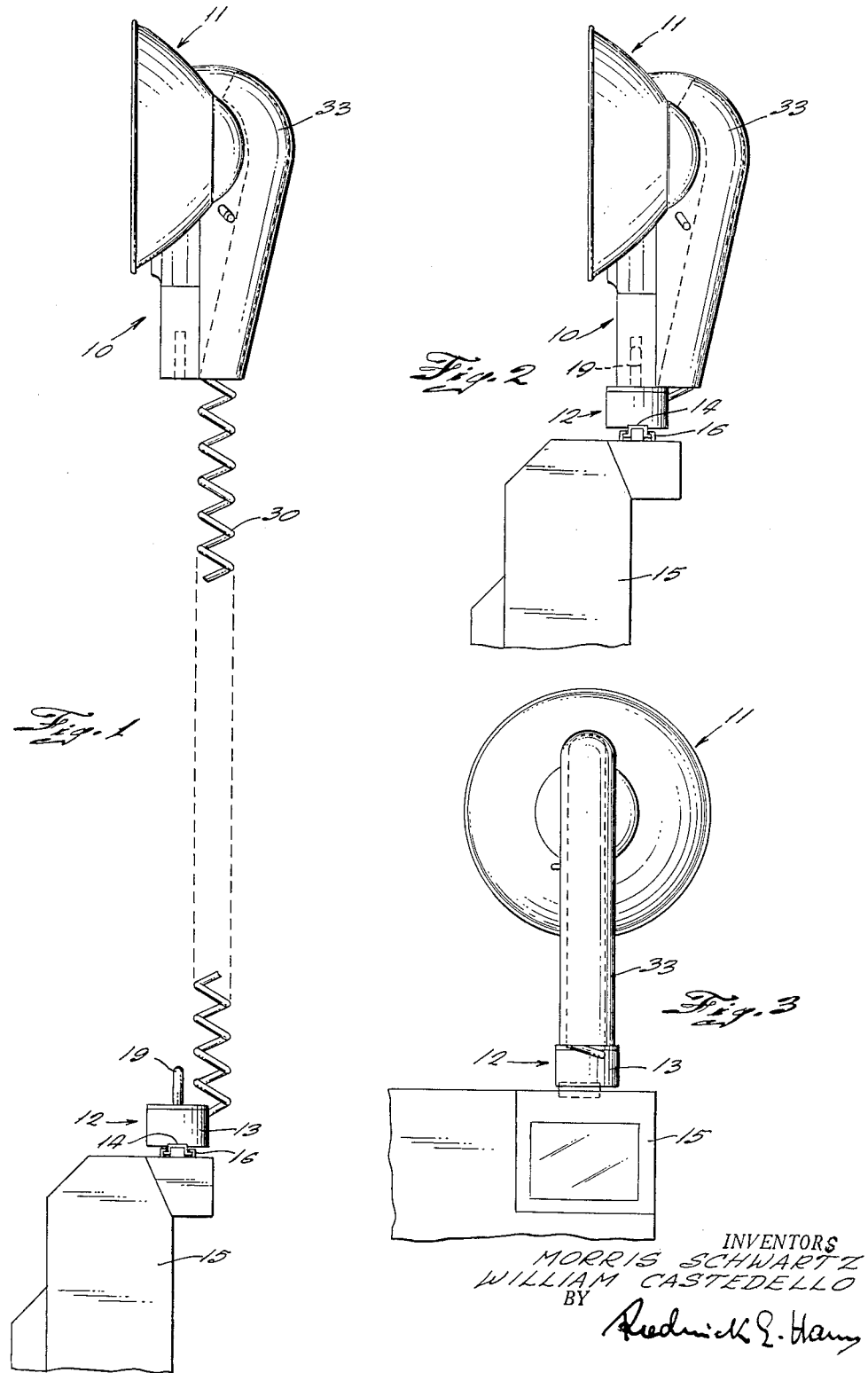
INVENTORS
MORRIS SCHWARTZ
WILLIAM CASTEDELLO
BY
Frederick E. Harry
ATTORNEY

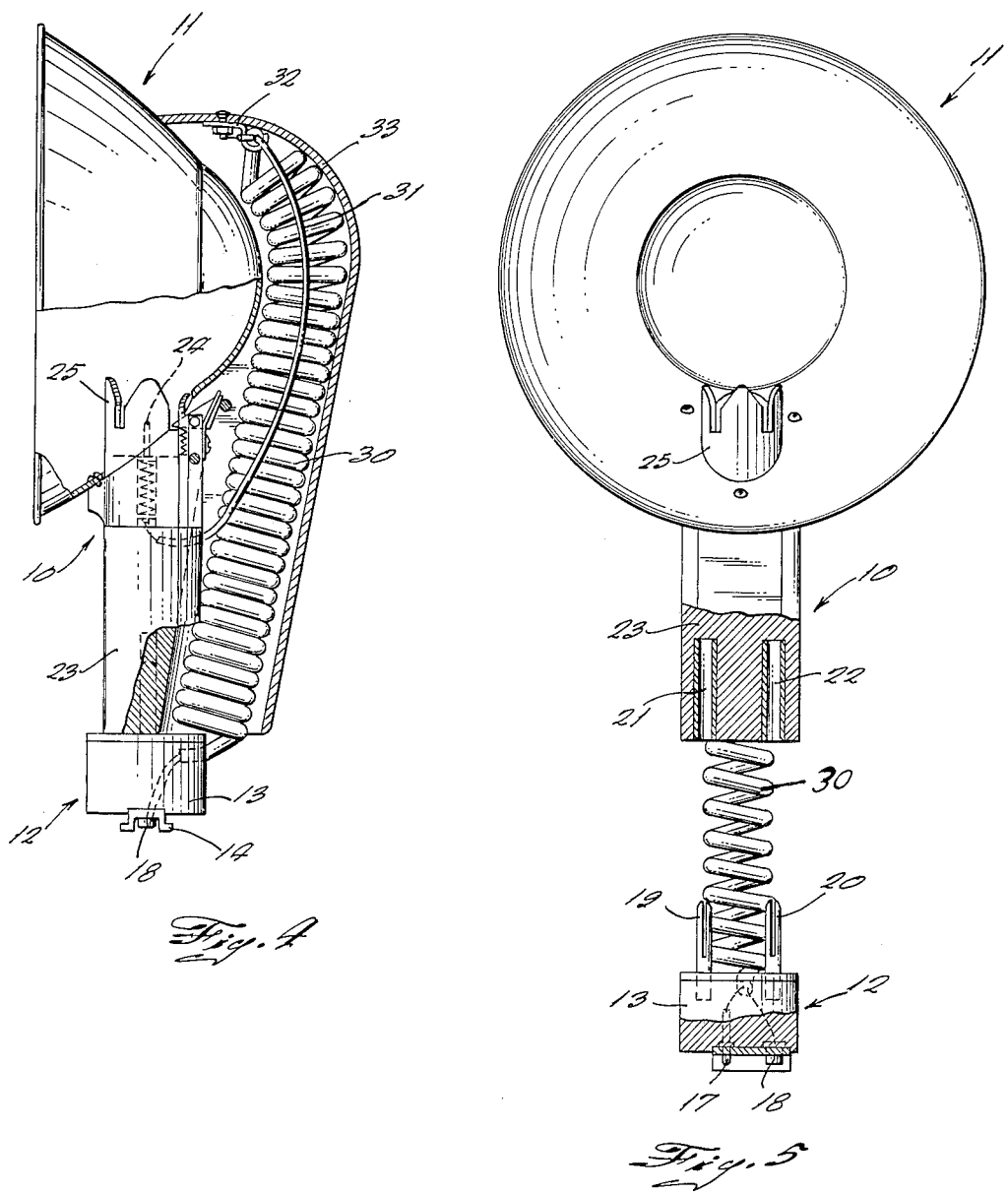

Oct. 25, 1955  M. SCHWARTZ ET AL  2,721,929
PHOTOFLASH EQUIPMENT
Filed May 6, 1950  5 Sheets-Sheet 3
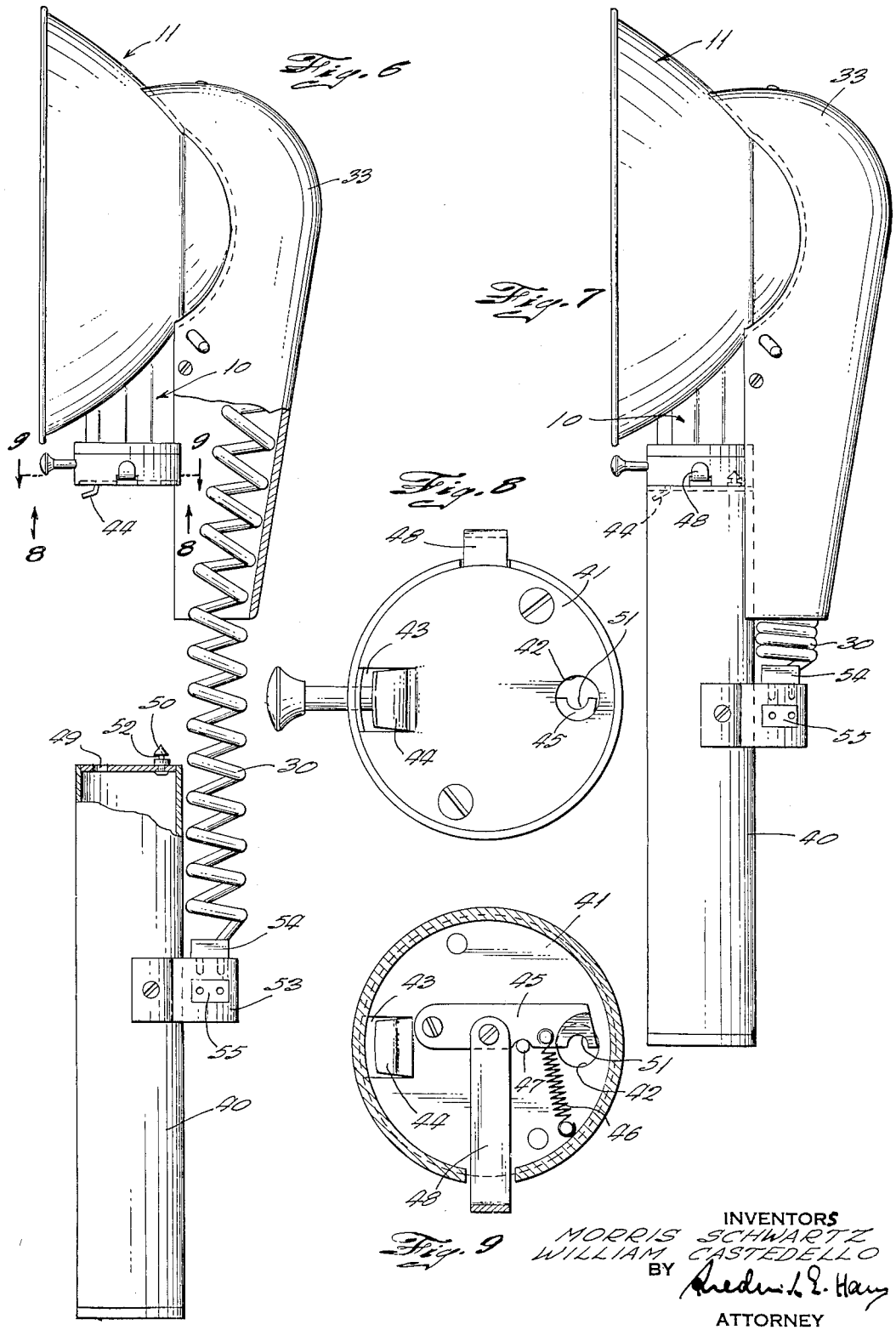
INVENTORS
MORRIS SCHWARTZ
WILLIAM CASTEDELLO
BY
ATTORNEY

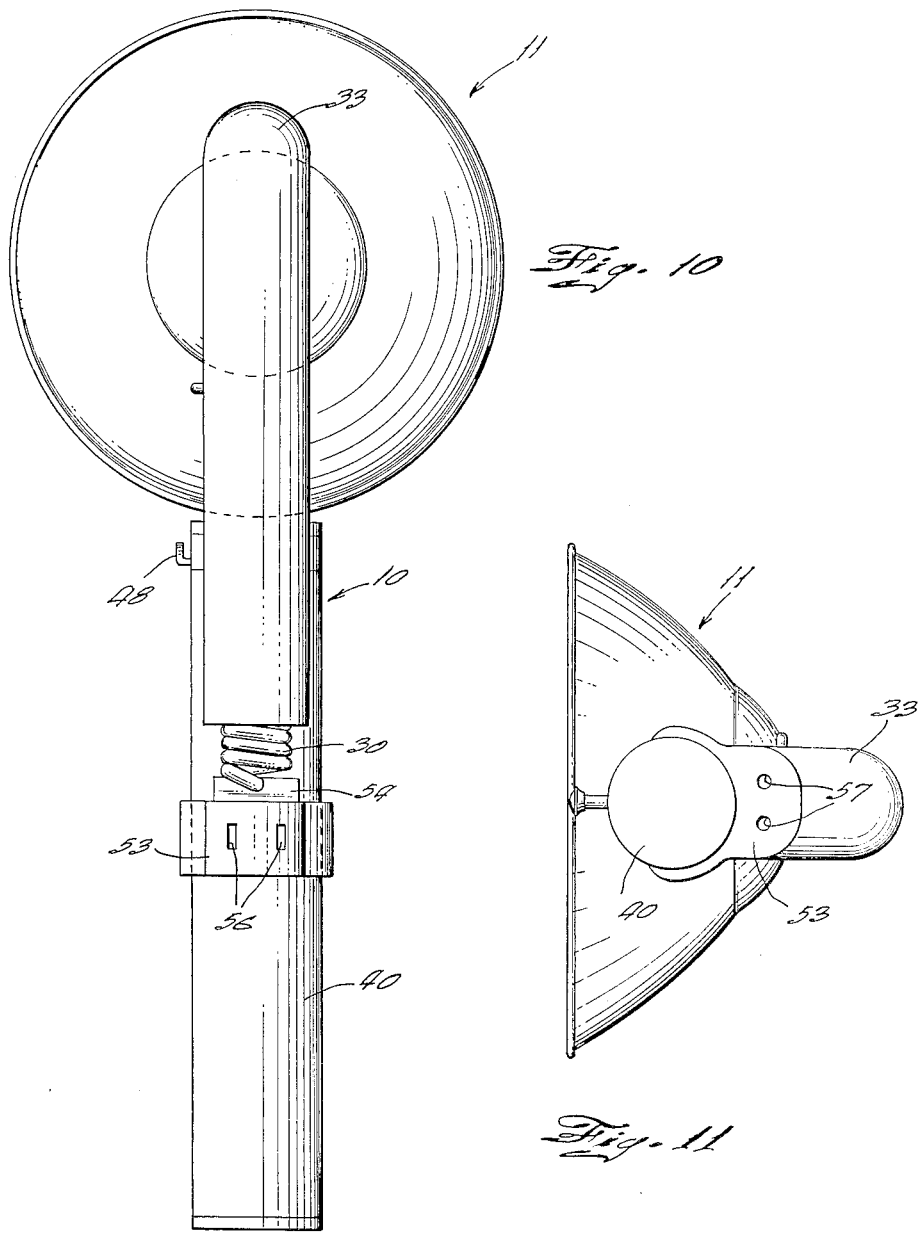

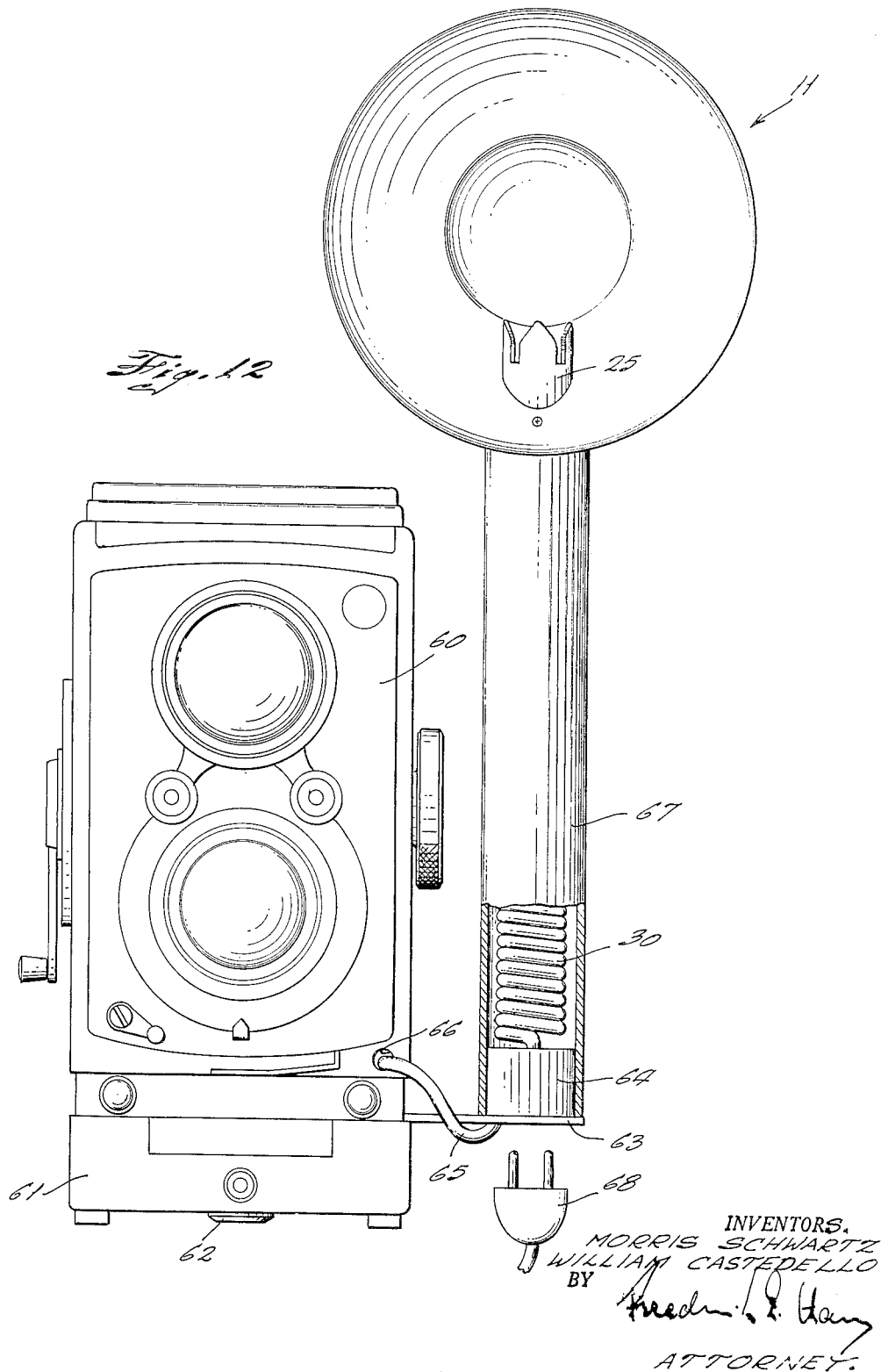

United States Patent Office 2,721,929
Patented Oct. 25, 1955

2,721,929

PHOTOFLASH EQUIPMENT

Morris Schwartz and William Castedello, Plainville, Conn., assignors to The Kalart Company Inc., Plainville, Conn.

Application May 6, 1950, Serial No. 160,506

7 Claims. (Cl. 240—1.3)

This invention relates to flash equipment as used in connection with photoflash work.

Flash equipment of the general type, above referred to, usually comprises a lamp socket mounted in front of a reflector and connected in circuit with a synchronizer and a source of current so arranged that upon operation of the actuation means the flash lamp is fired and the camera shutter is tripped in a selected time relationship.

The source of current, such as one or more batteries, can be disposed in a separate battery case or in the camera casing proper. In the latter case, the socket with the reflector is usually directly supported on the camera while in the first case, the battery case supports the socket and the reflector and is, in turn, detachably secured to the camera casing. In either case, the source of the flash, that is, the lamp is close to the camera objective and, hence, in approximately the same position as the objective as seen from the target to be photographed. However, under certain conditions a different distribution of light is preferable for the purpose of obtaining good pictures.

Accordingly, it is one of the objects of the invention to provide means by which the socket with the reflector can be placed conveniently in various selected positions relative to the lens objective and the target respectively.

Another object of the invention is to mount the socket with the reflector movably relative to the camera objective and the target respectively while the source of current remains stationary relative to the camera.

Another more specific object of the invention is to provide means by which the lamp socket with the reflector is detachably secured to a connector which remains attached to the camera casing or the battery case, as the case may be, and is connected with the socket by means of an extending wire.

Another object of the invention, allied with the preceding one, is to provide a handle or grip by means of which the lamp socket and the reflector can be conveniently and safely held when separated from the connector.

Another object of the invention is to provide a casing in which the extending wire is housed and concealed when the lamp socket and reflector unit is supported by the camera casing or battery case, as the case may be.

Other and further objects, features and advantages of the invention will be pointed out hereinafter and set forth in the appended claims forming part of the application.

In the accompanying drawings several now preferred embodiments of the invention are shown by way of illustration and not by way of limitation.

In the drawings:

Fig. 1 is a side view of a flash equipment according to the invention showing the socket-reflector unit of the equipment physically separated from the camera casing with which said unit is electrically connected.

Fig. 2 shows a side view of the socket-reflector unit mounted on the camera casing.

Fig. 3 is a rear view of Fig. 2.

Fig. 4 shows a sectional side view of the flash equipment according to Fig. 1.

Fig. 5 shows a sectional front view of Fig. 4, the connector being illustrated separated from the socket-reflector unit.

Fig. 6 shows a sectional side view of a modification of a flash equipment according to the invention, the socket-reflector unit being illustrated physically separated from a battery case which with it remains electrically connected.

Fig. 7 is a side view of the flash equipment according to Fig. 6, the socket-reflector unit being shown applied to the battery case.

Fig. 8 is an enlarged detail view taken on line 8—8 of Fig. 6.

Fig. 9 is an enlarged detail section taken on line 9—9 of Fig. 6.

Fig. 10 is a rear view of Fig. 7.

Fig. 11 is a bottom view of Fig. 7, and

Fig. 12 is a front view, partly in section, of still another modification of a flash equipment according to the invention.

Referring first to the embodiment according to Figs. 1 to 5 in detail, the embodiment of a flash equipment according to the invention shown in these figures comprises a socket generally designated by 10, a reflector generally designated by 11 and a connector generally designated by 12.

Socket 10 may be of conventional design and may or may not be equipped with a lamp ejector. It can be designed to receive either standard size lamps or midget lamps. The reflector 11 may also be of conventional design. It is fixedly secured to the socket in a light reflecting position. Inasmuch as the design of the socket, the reflector and the lamp ejecting means, if any, are not essential for the understanding of the invention they are not described here in detail. The general shape of the socket-reflector unit can be clearly seen on the drawings.

The connector 12 is shown as a separate unit. It may comprise a cylindrical block 13 of insulation material supporting on its bottom side a contact and locking shoe 14 to secure mechanically the connector to the top of the casing 15 of a camera by slipping shoe 14 into corresponding tracks 16 mounted on the camera casing. Shoe 14 also serves to establish the electrical connection between the connector and a source of current such as batteries conventionally housed within the camera casing 15. For this purpose, two contact elements 17 and 18 protrude from the shoe. These contact elements are arranged to engage corresponding contact elements disposed between the guide tracks 16 on the camera casing. Contact elements 17 and 18 may be under spring pressure to secure the connector shoe to the guide tracks or the shoe of the camera casing. Inasmuch as the arrangement of locking and contact shoes such as 14 and 16 is conventional, a detailed description does not appear to be essential for the understanding of the invention. It suffices to state that connector 13 can be detachably secured to the casing of a camera or to any other support such as a battery case of a flashgun equipped with a receiving locking and contact shoe. The top side of insulation body 13 supports locking means for detachably securing the socket-reflector unit to the connector. These locking means may be designed in any suitable manner. According to the embodiment shown, two prongs 19 and 20 are provided which are arranged to engage corresponding openings or bores 21 and 22 in an extension arm 23 of the socket. Prongs 19 and 20 may be split and somewhat springy to secure the socket in its position on the connector. It should be emphasized in this connection that the locking means 19 to 22 merely serve to hold the socket-reflector unit mechanically in position and are not connected to carry any current.

The electrical connection between contact elements 17 and 18 and terminals 24 and 25 of the lamp socket is made by means of a coiled two-wire cable 30. This cable is of a type possessing a certain inherent springiness so that it tends to contract its coils into the position shown on Fig. 4. At the outer or lower end of the cable, the two wires thereof are connected to contact elements 17 and 18 as can best be seen on Fig. 5. At the other end of the cable one wire is connected by a lead wire 31 to socket terminal 24. The other wire is electrically connected by suitable means such as soldering or a bracket 32 to a metal casing 33 which through the reflector and other components of the equipment is in electrical contact with the second socket terminal 25, thereby establishing a circuit connection between the socket terminals and contact element 17 and 18. Of course, it is also possible to connect the second cable wire directly with the socket terminal 25 in which case casing 33 may be made of a non-conducting material such as a plastic. Casing 33 is secured to the reflector-socket unit by any suitable means such as screws and is shaped to form a grip or handle for the aforesaid unit. Casing 33 may be streamlined by fairing the same to the reflector and the socket. The casing can be clearly seen on Figs. 1 to 4. In addition to serving as a handle or grip, the casing also serves as a housing for the main portion of the coiled cable when the same is contracted, that is, when the socket-reflector unit is applied to the connector as shown on Figs. 2, 3 and 4.

The operation of the embodiment of the invention, as hereinbefore described, is as follows:

Let it be assumed that the socket-reflector unit is fastened to the connector and that the connector is secured to the camera casing or to the head of a battery case, as the case may be. The components of the flash equipment are then in the position shown on Figs. 2 and 3. When it is now desired to move the socket-reflector unit or in other words the source of the flash to another position relative to the objective and the target respectively, the socket-reflector unit is simply pulled out of the socket which remains attached to its support. The said unit can then be freely moved within certain limits by the extension of the cable coils as indicated on Figs. 1 and 5. In case it is desired to return the socket-reflector unit to its original position the said unit is simply slipped upon prongs 19 and 20. The cable will automatically return into its position in casing 33 by reason of the inherent elasticity of the wire coils.

The embodiment according to Figs. 6 to 11 inclusive is similar in principle to the embodiment of the invention hereinbefore described in that a socket-reflector unit can be mechanically separated from its source of current while remaining electrically connected with the same.

The flash equipment according to Figs. 6 to 11 comprises again a socket 10 and a reflector 11 structurally combined to form a unit. The source of current for the flash equipment, such as one or more batteries (not shown), are housed in a case 40 shown as a battery case of conventional design. The socket-reflector unit can be detachably secured to the battery case by any suitable means. According to the embodiment shown, the socket reflector unit has a base plate 41 with an opening 42 and a second somewhat larger opening 43 from which protrudes a slanted hook 44 as can best be seen on Fig. 6. At the upper side of plate 41, that is, on the side facing away from the battery case, an arm 45 is pivotally mounted. The length and the position of this arm are so that its front end partly covers opening 42 as can be clearly seen on Figs. 8 and 9. A loaded spring 46 biases arm 45 into its position partly covering opening 42, the arm movement being limited by a stop 47. A laterally protruding bar 48 serves to pivot arm 45 into a position substantially completely uncovering opening 42. Hook 44 and arm 45 cooperate with a slot 49 and a locking pin 50 provided at the top wall of battery case 40. As is indicated on Fig. 7, the socket-reflector unit is applied to the battery case by slipping hook 44 into slot 49 and inserting locking pin 50 into opening 42. The locking pin and the forward end of arm 45 are so shaped that the conical top of the locking pin will press arm 45 aside against the action of spring 46 until the edge of the semi-circular groove 51 of the arm can slip into a groove 52 of the locking pin, thereby securing the socket-reflector unit to the battery case.

The electrical connection between the socket and batteries contained in the battery case is again made by a coiled springy cable 30 the main portion of which is concealed in grip-shaped housing 33, as has been described in detail in connection with Figs. 1 to 5 inclusive. The outer end of the cable is connected to a connector 53 which in turn is secured to a battery case 40 and is in circuit connection with the batteries.

The connection between the cable and the connector can be made by fixedly securing the cable wires directly to contact elements in the connector or detachable by means of a plug 54. Connector 53 can also be used to make additional connections. For instance, it may be equipped with a socket 55 for a synchronizer cord, with socket contacts 56 for connecting additional flash lamp sockets and with socket contacts 57 for connecting the light unit of a light beam projecting range finder.

In this connection it should be mentioned that the details of the circuit connections within the socket and the connector are not essential for the understanding of the invention and are, hence, not described in detail. It suffices to mention that in the arrangement according to Figs. 1 to 5 inclusive the synchronizer is generally disposed within the camera casing while in the arrangement according to Figs. 6 to 11 inclusive the synchronizer is generally either detachably secured to the flash equipment or to a suitable part of the camera.

The operation of the embodiment according to Figs. 6 to 11 inclusive will be obvious from the previous description. The socket-reflector unit may either be used applied to the battery case, as shown in Figs. 7, 10 and 11, or physically separated from the battery case, stretching or extension of the cable coils permitting comparatively extensive movements of the said unit relative to the battery case. The socket-reflector unit can be separated from the battery case by simply pushing bar 48 so that it releases locking pin 50.

Fig. 12 shows photoflash equipment adapted for use in connection with a conventional photographic camera 60 of the reflex type.

The flash equipment according to the invention comprises a casing 61 for the source of current such as batteries. Casing 61 may have a substantially rectangular shape similar in outline to the camera casing of a conventional reflex camera and is fastened to the bottom of the camera by any suitable means for instance a knurled screw 62 threaded into the tripod hole of the camera.

The casing supports a bracket 63 to which is secured a connector 64. The connector is connected by a cable 65 to the source of current in casing 61 either permanently or by means of an outlet 66 provided for this purpose in the casing of camera 60. The connector is also connected to one end of the coil cable 30, the other end of which is connected to the terminals of the flash lamp socket as has been described in connection with the previously explained figures. The flash unit according to Fig. 12 comprises a substantially cylindrical casing 67 which houses the coils of cable 30 and is fitted with a tight fit upon connector 64. Of course, additional means to secure detachably the flash unit casing to the connector may also be provided so that the flash unit casing may be safely used to support the camera.

If it is intended to place the flash bulb with its reflector in a different position relative to the camera, casing 67 is pulled out of connector 64, the cable coils permitting such physical separation without interfering with the electrical connections.

A plug 68 engageable with a corresponding outlet of socket 64 may be provided to connect additional flash units to the camera.

A conventional synchronizer, either built in the camera or connected to the flash unit proper, should of course be provided.

While the invention has been described in detail with respect to certain now preferred examples and embodiments of the invention it will be understood by those skilled in the art after understanding the invention, that various changes and modifications may be made without departing from the spirit and scope of the invention and it is intended, therefore, to cover all such changes and modifications in the appended claims.

What is claimed as new and desired to be secured by Letters Patent is:

1. A photoflash equipment comprising a socket for a photoflash lamp and a reflector secured to each other to form a structural unit, a casing for a source of current supportable by a photographic camera for coaction therewith in taking a photograph, means for detachably supporting said socket-reflector unit on said casing in a position stationarily relative thereto, a connector unit arranged to be electrically connected with a source of current in said casing and to be supported on the casing, wire conducting means electrically connecting the lamp socket with the connector unit, said conducting means comprising a springy coiled cable biased to contract its coil and extendable by pull, the said coil cable forming the only physical connection between the socket-reflector unit and the casing when said unit is detached from said casing and providing for free and arbitrary movements of the socket-reflector unit relative to the casing; and a housing having an opening secured to the socket-reflector unit, the main portion of the coiled cable being retracted into said housing through said opening when the socket-reflector unit is applied to the casing and extendable from the said housing through said opening when the socket-reflector unit is physically separated from the connector unit.

2. A photoflash equipment as described in claim 1, wherein said housing is in form of a grip for holding the socket-reflector unit, the said housing being faired to the socket and the reflector.

3. A photoflash equipment as described in claim 2, wherein said coiled cable is connected at one end to the lamp socket and at the other end to the connector, said latter end protruding through the opening of the housing for the conducting means, the main portion of the coiled cable being retracted into the said housing when the socket-reflector unit is applied to the casing for the source of current and is adapted to be pulled out of the said housing and to be extended when the socket-reflector unit is separated from the casing.

4. A photoflash equipment comprising a socket for a photoflash lamp and a reflector secured to each other to form a structural unit, an open housing in form of a grip structurally combined with the socket-reflector unit and faired into the reflector and the socket, a casing for a source of current supportable by a photographic camera for coaction therewith in taking a photograph, a connector having prongs arranged to engage corresponding openings in the socket-reflector unit for mechanically and detachably securing the said unit to the connector and a locking and contact shoe arranged to detachably secure the connector to the casing for the source of current and to establish circuit connections with a source of current in the said casing, and a springy coiled cable biased to contract its coils and connected at one end to the lamp socket and at the other end to the connector, said latter end protruding from the housing, the main portion of the coiled cable being retracted into the housing when the socket-reflector unit is applied to the connector and adapted to be pulled out of the said housing and to be extended when the socket-reflector unit is separated from the connector.

5. A photoflash equipment comprising a casing for a source of current supportable by a photographic camera in a fixed spatial relationship relative thereto, a socket for a photoflash lamp and a photoflash lamp reflector secured to each other so as to constitute a socket-reflector unit, support means for detachably mounting said socket-reflector unit on the casing, said support means having first fastening means engageable with the casing and second fastening means engageable with the socket-reflector unit for detachably fastening the support means to said casing and said socket-reflector unit respectively, a connector unit attachable to the casing for establishing circuit connections between a source of current received in the casing and said connector unit, and an electric cable electrically connected with said lamp socket and said connector unit, said cable being in form of a springy coiled cable biased to contract its coils and extendable by pull, the said cable constituting the only physical connection between the socket-reflector unit and the casing when said unit is detached from said casing so as to provide for free and arbitrary movements of the socket-reflector unit relative to a photographic camera supporting said casing and an object to be photographed thereby permitting a user of the photoflash equipment to obtain a desired distribution of light notwithstanding the fixed position of the casing, said socket-reflector unit including a compartment housing and substantially concealing said coiled cable when the socket-reflector unit is mounted on said casing.

6. A photoflash equipment according to claim 5, wherein the said second fastening means of the support means comprise prongs engageable in corresponding openings in the socket-reflector unit for mechanically securing the said unit to the support means.

7. A photoflash equipment according to claim 5, wherein the said support means and the said connector unit are structurally combined, the said first fastening means of the support means being in form of a contact shoe slidably engageable with said casing for mechanically attaching the support means and the connector unit to the casing and electrically connecting the connector unit with a source of current received in said casing.

References Cited in the file of this patent

UNITED STATES PATENTS

| 457,687 | Weimer | Aug. 11, 1891 |
| 1,287,250 | Dailey | Dec. 10, 1918 |
| 1,692,394 | Sundh | Nov. 20, 1928 |
| 1,913,848 | Miskella | June 13, 1933 |
| 1,932,098 | Boesser | Oct. 24, 1933 |
| 2,096,856 | Nuchterlein | Oct. 26, 1937 |
| 2,206,703 | Lowe | July 2, 1940 |
| 2,228,009 | Harford | Jan. 7, 1941 |

FOREIGN PATENTS

| 6,267 | Great Britain | 1905 |
| 108,406 | Great Britain | Aug. 9, 1917 |